L. H. BROOME.
PIN SETTER FOR BOWLING ALLEYS.
APPLICATION FILED JULY 17, 1917.

1,290,063.

Patented Jan. 7, 1919.
6 SHEETS—SHEET 1.

WITNESSES

INVENTOR
L. H. Broome.
BY
ATTORNEYS

L. H. BROOME.
PIN SETTER FOR BOWLING ALLEYS.
APPLICATION FILED JULY 17, 1917.

1,290,063.

Patented Jan. 7, 1919.
6 SHEETS—SHEET 3.

WITNESSES

INVENTOR
L. H. Broome.
BY
ATTORNEYS

L. H. BROOME.
PIN SETTER FOR BOWLING ALLEYS.
APPLICATION FILED JULY 17, 1917.

1,290,063.

Patented Jan. 7, 1919.
6 SHEETS—SHEET 5.

WITNESSES

INVENTOR
L. H. Broome
BY
ATTORNEYS

UNITED STATES PATENT OFFICE.

LEWIS H. BROOME, OF JERSEY CITY, NEW JERSEY.

PIN-SETTER FOR BOWLING-ALLEYS.

1,290,063.

Specification of Letters Patent.   Patented Jan. 7, 1919.

Application filed July 17, 1917. Serial No. 181,015.

*To all whom it may concern:*

Be it known that I, LEWIS H. BROOME, a citizen of the United States, and a resident of Jersey City, in the county of Hudson and State of New Jersey, have invented a new and Improved Pin-Setter for Bowling-Alleys, of which the following is a full, clear, and exact description.

This invention relates to bowling pin setters of that type in which the pins are automatically centered and set upon the alley by the pin boy, who places the pins in the machine or setter and then operates suitable devices which perform the centering and setting-up operations.

The invention has for its general objects to improve and simplify the construction and operation of pin setting machines so as to be reliable and efficient in use, comparatively simple and inexpensive to manufacture, of durable and substantial construction, and so designed that the pin boy can easily and quickly fill the machine with the pins and then easily and quickly operate the machine to automatically center and set up the pins on the alley.

A more specific object of the invention is the provision of a novel form of carrier or frame whereby the attendant can easily and quickly, and without any special care, initially position the pins so that they can be dropped and centered accurately with comparatively no noise or wear and tear and with a minimum effort on the part of the attendant.

An additional object of the invention is to provide a novel arrangement of devices for holding a pin upright until the carrier is lowered, when releasing means engaging the floor will operate the devices to allow the pin to drop a certain distance short of the floor, when pin-centering means come into play for arresting the pin and centering the same about one-eighth of an inch from the floor or alley and thereupon the upward movement of the carrier or frame allows the pin to be released and set up on the alley without noise or shock.

A further object is to adjustably support the pin-holding and centering devices so that the pin setter or machine can be adapted for all types and sizes of pins now in use.

The invention has as a further object the provision of novel means for movably supporting the pin carrier or frame so that it can be lowered and raised in the pin-setting operation with comparative ease on the part of the attendant.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views.

Referring to the drawings, A designates the carrier of the pin setter, B the pin-holding and centering devices, and C the suspension and operating means for the carrier.

Figure 1:
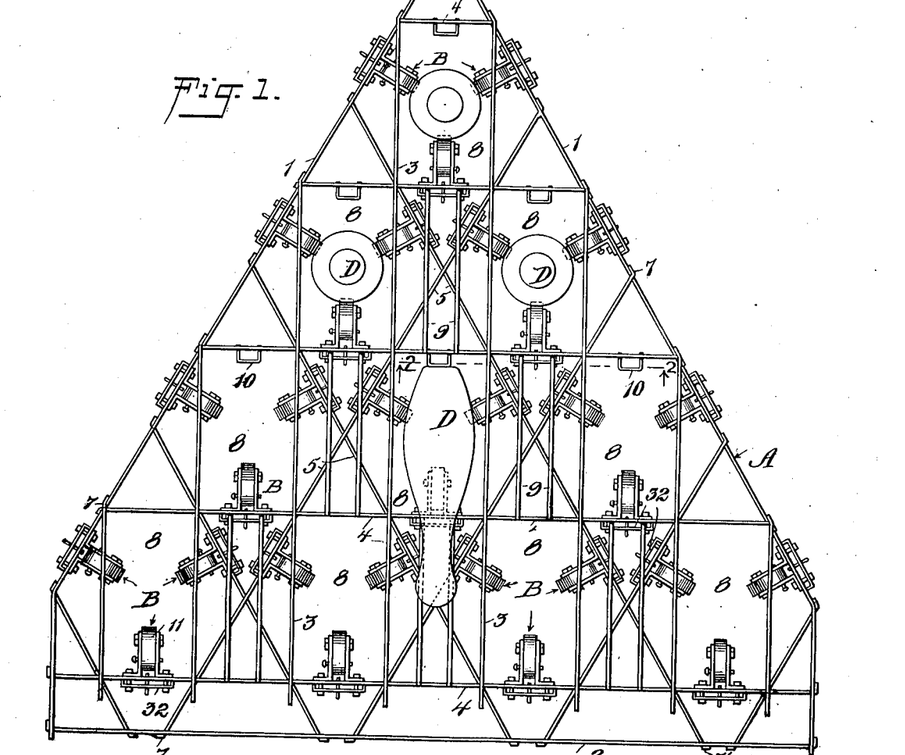
Figure 1 is a plan view of the carrier and attached parts with the three front pins held upright and another pin in the act of being placed in its upright position, the carrier being empty as regards the other pin-holding means.
Figure 2:
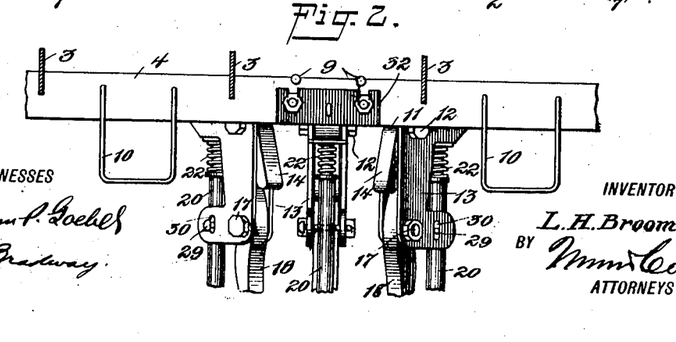
Fig. 2 is an enlarged detail sectional view on the line 2—2, Fig. 1.
Figure 9:
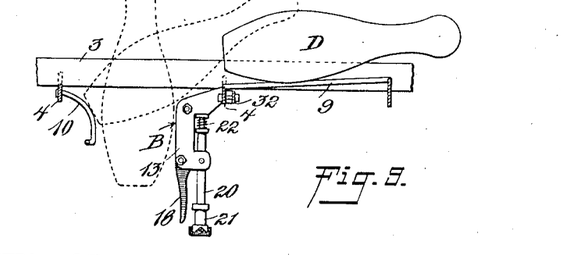
Fig. 9 is a vertical section showing a pin passing through successive stages in assuming an upright position after being placed on a carrier by the attendant.
Figure 14:
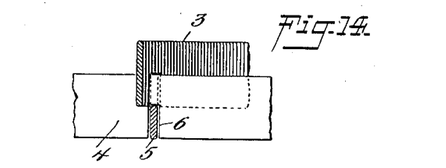

The carrier A is made light but substantial by utilizing metal strips arranged in the form of a triangular frame. It consists of side members 1, a rear member 2, longitudinal and transverse members 3 and 4, and diagonal members 5, which latter are parallel with the side members 1. The strips at the points of crossing are halved or provided with recesses 6 so that the strips can interlock at these points, as clearly shown in Fig. 14, and the longitudinal strips 3 are so arranged that they project upwardly above the other strips 4 and 5. This arrangement insures the proper placing of the pins by the pin boy. The ends 7 of the strips are bent back against the side and rear members, as clearly shown in Fig. 1. In this manner the parts of the frame or carrier can be easily made by machinery and quickly assembled without use of rivets or other fastenings. As shown in Fig. 1, certain rectangular spaces designated 8 are open and not crossed by the diagonal strips or reinforcing members 5 and it is in these open spaces or pockets in the carrier that the pins are placed. These open spaces are arranged the proper distance apart to insure the setting of the pins in the regulation manner. Behind each open space or pocket 8 the frame is formed into a platform which is inclined downwardly toward the front, said platform being made by utilizing a pair of parallel rods 9 slightly spaced apart and having their ends fastened in the transverse strips 4. These rods 9 are below the top edges of the longitudinal strips 3, so that when a pin is placed on a platform it will automatically center itself or roll to the center, even though it should be carelessly placed by the pin boy on one of the longitudinal strips 3. When on the platform the pin is given a slight push forwardly and it will slide from a horizontal to an upright position, as shown in Fig. 9, in the pocket immediately in front of the platform and there be held in upright position by the devices B.

Figure 3:
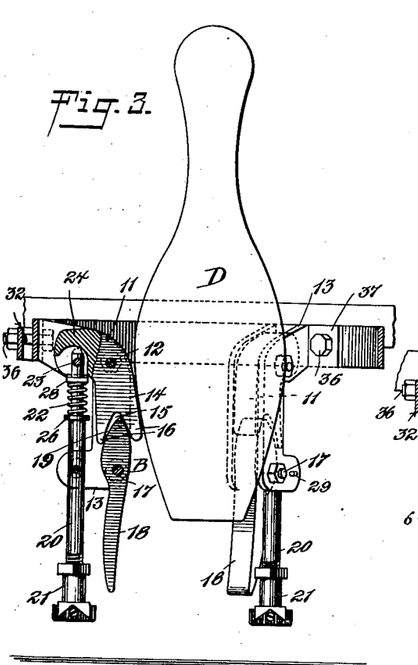
Fig. 3 is a detail sectional view showing a pin held in an upright position, before being dropped into the pin-centering members.
Figure 4:
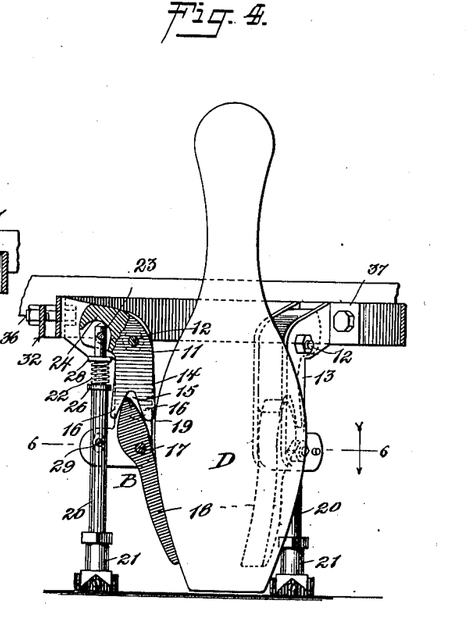
Fig. 4 is a similar view showing the pin held by the centering members.

There are a plurality or group of pin holding and centering devices B at each pocket or opening 8 of the carrier, and these devices of each group are arranged one hundred and twenty degrees around the center of the pocket. At the forward end of each opening or pocket is a downwardly curved deflector 10, Fig. 9, which assists in guiding the pin to an upright position, the bottom of the pin striking the deflector and then sliding downwardly thereon until the pin is gripped by the three devices B. As shown in Fig. 1, the pockets for the last row of pins do not have platforms behind them, since these pockets are within close reach of the pin boy and he can place the pins directly in the groups of devices B. Each device B comprises a pin-holding member 11 fulcrumed on a horizontal pivot 12 which is carried by a bracket formed of a pair of members 13 secured to the framework of the carrier. The lower end of the pin-engaging portion 14 of the member 11 is formed with a recess 15 which provides bifurcations 16, and directly under the holding member 11 and mounted on a pivot 17 in the same bracket is a pin-centering member 18 which has a nose portion 19 engaging the bifurcations 16, and the lower portion of this centering member is designed to grip the lower portion of the pin D, Fig. 3, below the girth thereof. Normally the centering member 18 is held retracted or away from the center of the pin-receiving pocket while the lower end of the holding member 11 is thrown toward the center but by reversing the position of these parts the pin will drop from the position shown in Fig. 3 and be caught and centered in the position shown in Fig. 4. This changing of the position of the parts is accomplished automatically by the mere lowering of the carrier under the control of the attendant. Associated with each device B is an upwardly yielding element 20 which has an adjustable foot-piece 21 adapted to engage the alley, whereby the element 20 will move upwardly against the tension of a spring 22. The upper end of the element 20 is connected by a horizontal pivot 23 with the upper lateral extremity 24 of the member 11, whereby the pin-engaging portion 14 of the member 11 will be thrown outwardly from the position shown in Fig. 3 to that shown in Fig. 4 and simultaneously the centering member 18 is thrown into engagement with the pin to catch it when it drops with the bottom just off the alley. The spring 22 has its lower end bearing on an abutment formed by a washer 26 resting on the shoulder 27 of the element 20, and the upper end of the spring bears against a bottom formed by a washer 28 which is held against the bracket members 13. The alley-engaging element 20 is guided both by the pivot pin 23 and by another pin 29 which passes through the element 20 and engages in vertical slots 30 in the bracket members 13. To compensate for irregularities in the surface of the alley the foot-piece 21 on each element 20 can be adjusted up or down on the alley by reason of the screw threads 31. When the carrier is lowered all the foot-pieces 21 will strike the surface of the alley and the elements 20 are arrested while the carrier continues to move a slight distance, whereby the pin-holding members 11 are actuated to simultaneously release the pins, and the members 18 will engage the pins and hold them simultaneously out of contact with the alley. When the carrier moves upwardly the pin-centering members 18 automatically release by reason of the springs 22 restoring the members 11 and 18 to normal position, but the members 11 cannot grip and hold the pins because the pins have dropped below gripping relation therewith, and consequently when the carrier moves upwardly the pins will set themselves on the alley in the required position. If several pins are left standing after the balls have been bowled, these standing pins do not have to be removed by the pin boy, as he places the knocked down pins in their proper pockets, and when the carrier is lowered the upper ends of the pins will pass between the open centering members 18 and be centered thereby during the automatic setting of the pins, as described.

Figures 5, 6, 7:
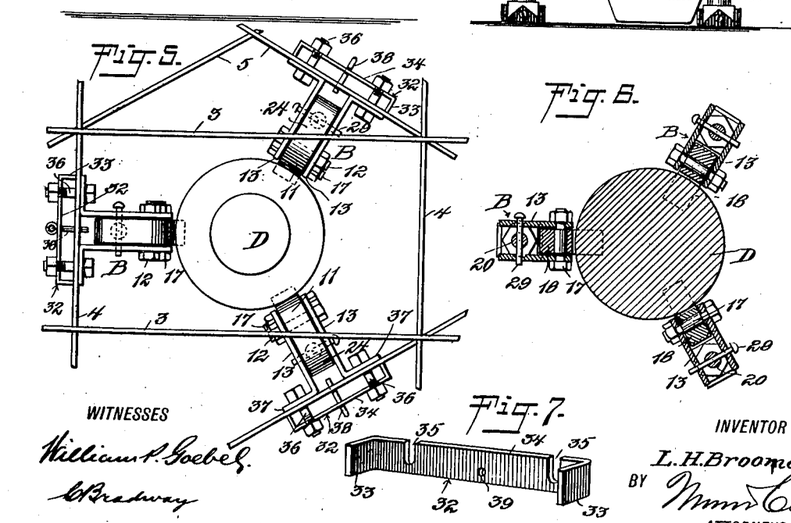
Fig. 5 is a plan view of Fig. 3.
Fig. 6 is a horizontal section on the line 6—6, Fig. 4.
Fig. 7 is a perspective view of one of the interchangeable adjusters or extension pieces.
Figure 8:
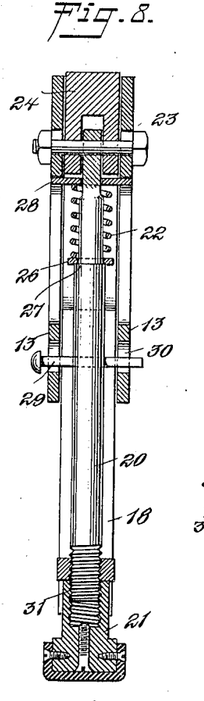
Fig. 8 is a vertical section of one of the yielding alley-engaging elements or feet for operating the pin-holding and centering devices.
Figure 10:
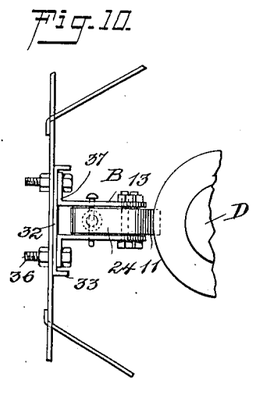
Figs. 10 and 11 are fragmentary plan views showing a pin-holding and centering device adjusted to different positions.
Figure 11:
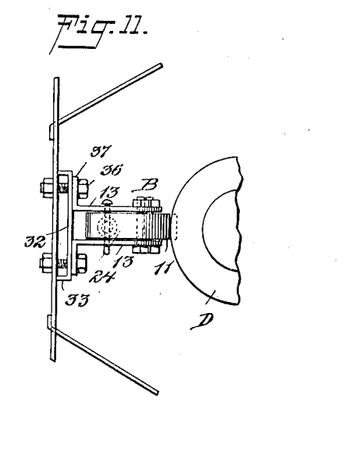
Figure 12:
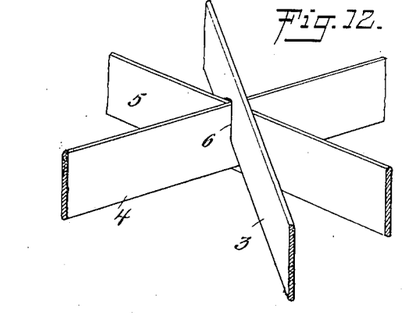
Figs. 12, 13 and 14 are detail views of various parts of the framework of the carrier.
Figure 13:
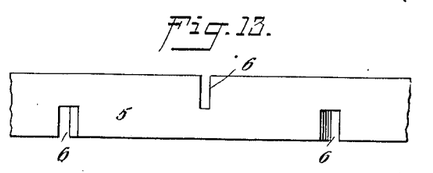

By reference to Figs. 5, 10 and 11 it will be noted that the bracket members 13 are supported in different positions. In Fig. 5 the adjusting or extension piece 32 is so positioned as to hold the devices B for large sized pins. Each extension piece 32 is a strip of metal having its ends bent into lugs 33 and the flat intermediate portion 34 has vertical recesses 35 for receiving clamping bolts 36, which latter pass through the ears 37 of the bracket members 13 and through the metal strips of which the carrier A is made. When the extension pieces are placed with the lugs 33 against the outer surfaces of the strips 1, 4 and 5, as the case may be, that is to say, outwardly from the center of the adjacent pin-receiving pocket of the carrier, the devices B will be in their outermost position from the center of the pocket so as to be adjusted for the largest sized pins. But when the extension pieces are applied, as shown in Fig. 10, the devices B will be adjusted for intermediate sized bowling pins; and still further, when the extension pieces 32 are reversed from the position shown in Fig. 10 and clamped in the position shown in Fig. 11, the devices B will be adjusted for the smallest sized bowling pins. If desired, a retaining fastener 38 can be employed in connection with each extension piece 32, the fastener passing through a central opening 39, Fig. 7, and engaging in the adjacent strip of the carrier, as shown in Fig. 5, whereby the fastener will hold the extension piece in place when the nuts of the bolt 36 are loosened.

Figure 15:
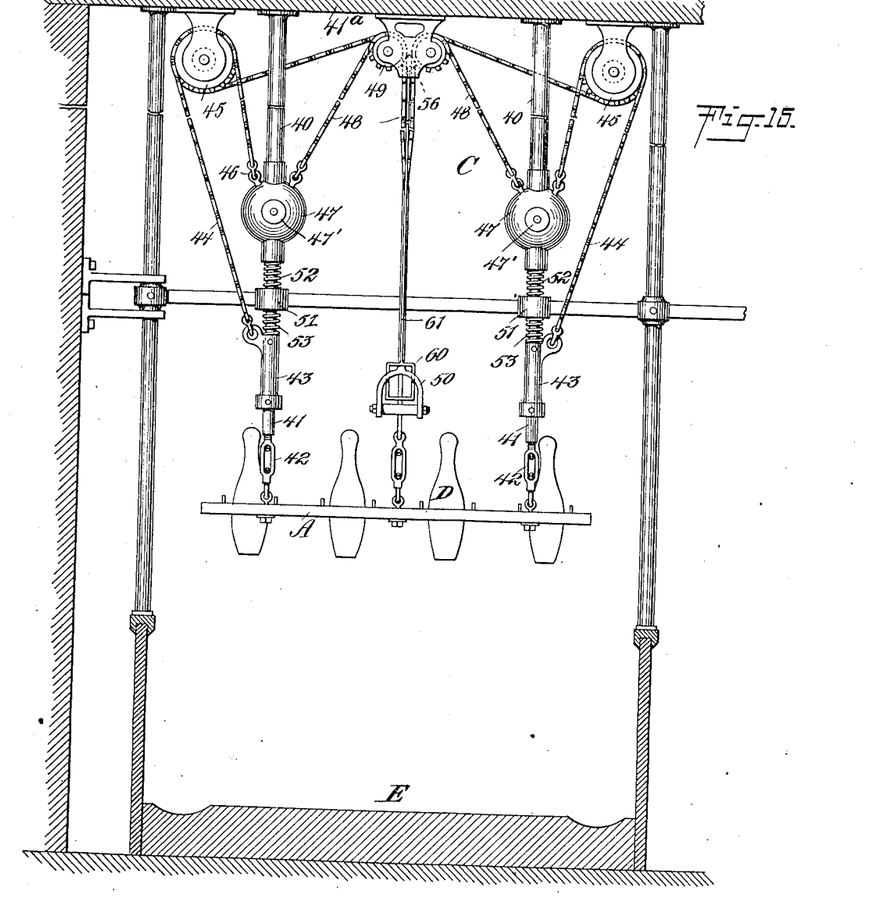
Fig. 15 is a front view of the guide frame structure for the pin carrier and of the operating means for the carrier.
Figure 16:
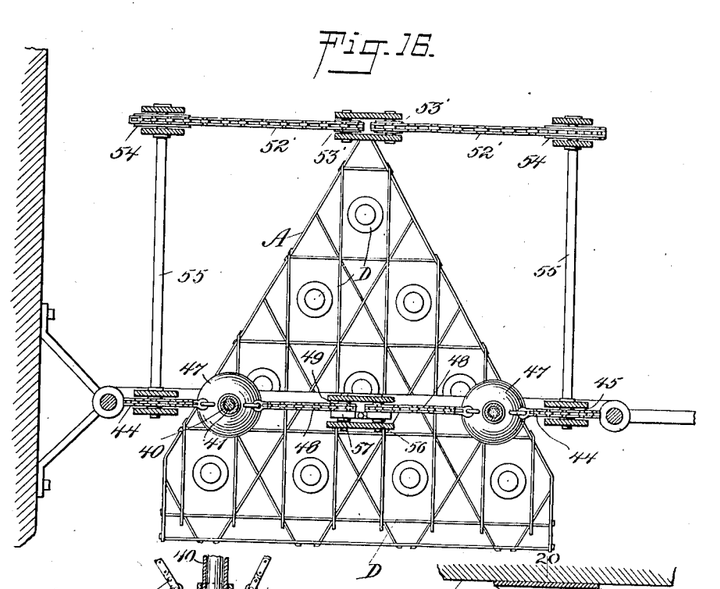
Fig. 16 is a horizontal section of the structure shown in Fig. 15.

In conjunction with Figs. 15 to 20 inclusive, the mechanism for movably mounting and operating the carrier A will be described. A plurality of tubular guides 40 are fastened to the ceiling or other overhead support 41ª at a point over the alley E and telescoping in these guides are rods 41 which are adjustably connected by turnbuckles or equivalent devices 42 with the pin carrier A. On these rods are fastened sleeves 43 to each of which is connected a sprocket chain or equivalent element 44 that rides over an overhead sprocket wheel 45 and continues downwardly and connects at 46 with a counterbalance weight 47 movable on the tubular guide 40. As shown in Figs. 15 and 16, two counterbalance weights 47 are employed and connected with each is a chain 48 that extends upwardly and passes over a sprocket wheel 49, and thence downwardly to a handle 50 with which both of the sprocket chains 48 are connected. When the operator pulls downwardly on the handle 50 the weights 47 are raised, which pays out the chain 44 so that the carrier A with the pins thereon is lowered to the floor of the alley E. When the pins are deposited the pull on the handle 50 is released so that the weights 47, which are only a few pounds heavier than the carrier with the pins thereon, will cause the empty carrier to be lifted to normal position. The rods 41 pass through fixed guides 51, and on the rods are helical compression springs 52 and 53 lying above and below the guides 51, so as to cushion the counterbalance weights in descending and the pin carrier in ascending. To support the carrier to move evenly, suspending chains or equivalent elements 52' are connected with the front end of the carrier, and these chains pass upwardly over sprocket wheels 53' mounted on the ceiling, as are the sprocket wheels 49, and from the sprocket wheels 53' the chains 52' extend outwardly in opposite directions and wind on sprocket wheels 54 which are fastened to shafts 55, Fig. 16, connected with the sprocket wheels 45. In connection with the sprocket wheels 49 is a brake shoe 56, Figs. 19 and 20, which engages the brake drum extensions 57 of the sprocket wheels. This shoe is urged into engagement with the drums 57 by a spring 58, but the brake can be released by means of a pull on the handle or grip 60 associated with the handle 50, the handle 60 being connected by a rod 61 with the brake shoe 56. The handles 50 and 60 are gripped at the same time by one hand, so that the brake shoe will first be released before the handle 50 is pulled downwardly to lower the carrier and the pins thereon. Whenever the hold of the handles 50 and 60 is released by the attendant, the brake will automatically set and stop the carrier A in the position it then occupies, so that the brake forms a safety device.

Figure 17:
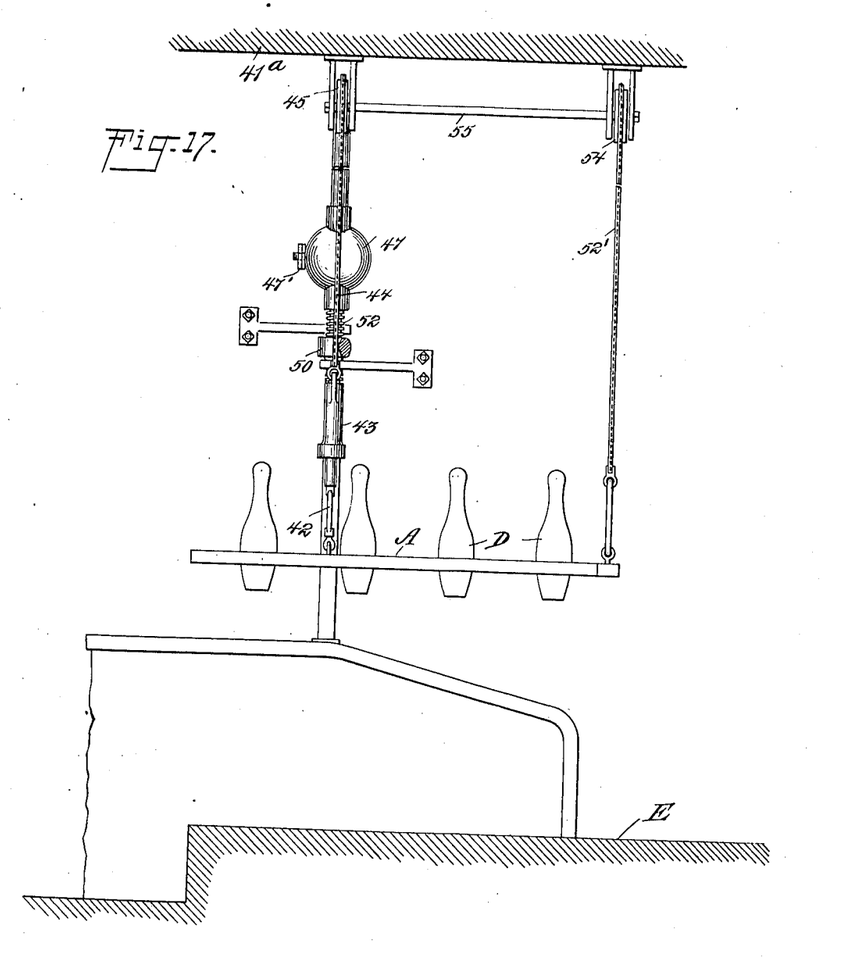
Fig. 17 is a side view of Fig. 15.
Figures 18, 19, 20:
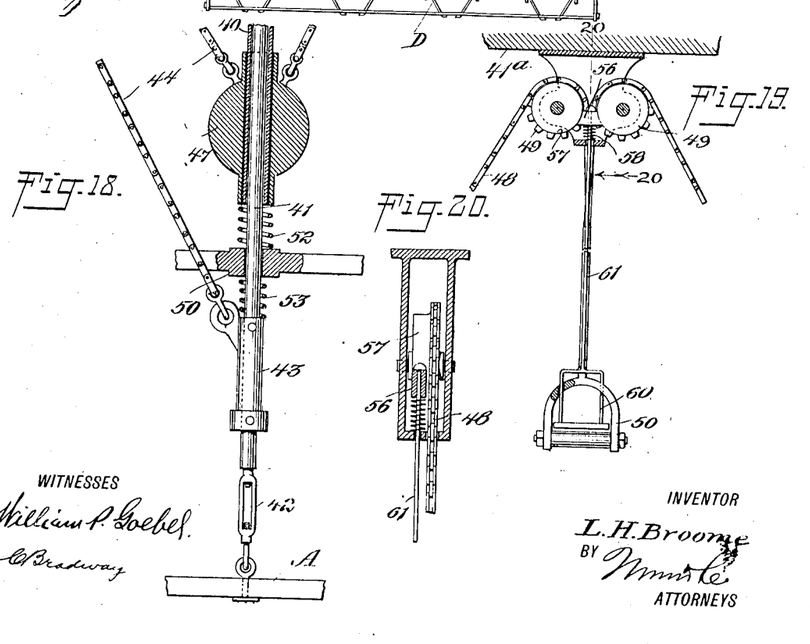
Fig. 18 is a detail sectional view showing one of the counterbalancing means for the carrier.
Fig. 19 is a detail view of the brake-releasing device and operating means for raising and lowering the carrier.
Fig. 20 is a vertical section on the line 20—20, Fig. 19.

When the pin centering and depositing devices B are adjusted for pins of different sizes, it is necessary to adjust the counterbalancing effect of the weights 47, and for this purpose the supplemental weights 47' are removably fastened to the main weights 47, as clearly shown in Figs. 15 and 17. When the large sized pins are used these supplemental weights are employed, so that the heavy pins will be effectively counterbalanced and less pull will be required on the part of the pin boy. When duck or candle pins are used the supplemental weights are removed.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. In a pin setter, the combination of a vertically movable carrier having a plurality of pin-receiving openings, a plurality of pivoted members at each opening with laterally movable lower ends adapted to grip a pin and hold the same upright, a plurality of members under the first-mentioned members operatively connected with the lower ends of the latter, whereby the lower members move inwardly by the outward movement of the lower ends of the upper members to catch and hold the pin in centered position slightly above the floor of the alley when the upper set of members moves outwardly to drop the pin, elements mounted on the carrier and arranged to engage the floor during the last part of the downward movement of the carrier, whereby the elements cause the upper members to move outwardly and the lower members to move inwardly, and spring means acting on the elements and both sets of members to restore the latter to normal position as the carrier moves upwardly and also to cause the lower members to release the pin.

2. In a pin setter, the combination of a plurality of pivoted members extending downwardly from their pivots with laterally movable lower ends, a plurality of members pivoted under the first members and each having a hinge joint with one of the latter, whereby the outward movement of the lower ends of the upper members moves the lower ends of the lower members inwardly, and an alley-striking element connected with one member of each pair of hingedly connected members for moving the upper members outwardly and the lower members inwardly to drop a pin on the alley when the elements strike the latter.

3. In a pin setter, the combination of a plurality of pivoted members extending downwardly from their pivots with laterally movable lower ends, a plurality of members pivoted under the first members and each having a hinge joint with one of the latter, whereby the outward movement of the lower ends of the upper members moves the lower ends of the lower members inwardly, an alley-striking element connected with one member of each pair of hingedly connected members for moving the upper members outwardly and the lower members inwardly to drop a pin on the alley when the elements strike the latter, and spring means acting on each element to urge the latter downwardly and acting on the members connected with each element, whereby the upper member is normally held inwardly and the lower member normally held outwardly.

4. In a pin setter, the combination of a plurality of pivoted members extending downwardly from their pivots with laterally movable lower ends, a plurality of members pivoted under the first members and each having a hinge joint with one of the latter, whereby the outward movement of the lower ends of the upper members moves the lower ends of the lower members inwardly, an alley-striking element connected with one member of each pair of hingedly connected members for moving the upper members outwardly and the lower members inwardly to drop a pin on the alley when the elements strike the latter, and spring means acting on each element to urge the latter downwardly and acting on the members connected with each element, whereby the upper member is normally held inwardly and the lower member normally held outwardly, said alley-striking element having a foot piece adjustable up or down.

5. In a pin-setting machine, the combination of a set of upper pin-gripping members, a set of lower pin-gripping members, a pivot for each member, the upper and lower members having laterally movable lower ends, means for connecting each lower member with an upper member for producing inward movement of the lower ends of the lower members while the lower ends of the associated upper members move outwardly, alley-striking elements, a hinge connection between each element and an upper member for actuating the latter, and spring means mounted on each element to return the latter to normal position after actuation by striking the alley.

6. In a pin-setting machine, the combination of a set of upper pin-gripping members, a set of lower pin-gripping members, a pivot for each member, the upper and lower members having laterally movable lower ends, means for connecting each lower member with an upper member for producing inward movement of the lower ends of the lower members while the lower ends of the associated upper members move outwardly, alley-striking elements, a hinge connection between each element and an upper member for actuating the latter, spring means mounted on each element to return the latter to normal position after actuation by striking the alley, a supporting structure, and brackets adjustably mounted on the structure and each carrying an element and the associated hingedly connected upper and lower members.

7. In a pin setter, a carrier having a pin-receiving opening and a plurality of pin-holding and centering devices on the carrier for depositing a pin in upright position, means interposed between the sides of the openings in the carrier and the said devices for adjustably mounting the latter for pins of different diameters, and means mounted on the carrier and engageable with the alley when the carrier is lowered to cause the devices to deposit the pin.

8. In a pin setter, a carrier having supporting members, a plurality of pin centering and depositing devices, and extension pieces positioned in non-contacting relation with the pins and coöperating with the supporting members for holding the devices in different positions for use of pins of different diameters.

9. In a pin setter, a carrier having supporting members, pin centering and depositing devices, extension pieces fastened between the devices and supporting members in different positions for adjusting the devices for pins of different diameters.

10. In a pin setter, a carrier having supporting members, a plurality of pin-setting devices on the carrier, extension pieces in the form of strips having laterally bent ends to form lugs, and bolts passing through the supporting members, extension pieces and devices either with or without the lugs engaging the supporting members, whereby the devices can be fastened in different positions.

11. In a pin setter, a carrier having pin-receiving openings, a group of pin-setting devices at each opening, each device comprising an upper member for engaging a pin, a lower member for catching the pin when dropped from the upper member and centering the pin, one member having bifurcations and the other engaging between the bifurcations, and an upwardly yielding element on the carrier and engageable with the upper member, whereby the members are actuated when the element strikes the alley upon the lowering of the carrier.

12. In a pin setter, a movable carrier, a plurality of members normally urged toward each other to grip a pin and hold the same upright, a plurality of members normally urged outwardly, means operatively connecting the members together, whereby the first-mentioned members move outwardly while the second-mentioned members move inwardly to catch the pin after being released by the first members, alley-striking devices connected with the members for producing the movement above mentioned when the carrier reaches the limit of its movement toward the alley, and means for restoring the members and devices to normal position as the carrier moves away from the alley, whereby the pin is set on the alley.

13. In a pin setter, the combination of a vertically movable carrier, brackets on the carrier, a member pivoted on each bracket for engaging a pin and holding the same upright, a second member on each bracket and engaged with the first member to be moved thereby to center the pin when dropped by the first member, and an element mounted in each bracket and connected with the first-mentioned member thereon to operate the latter by the element engaging the alley when the carrier nears the limit of its downward movement, the first-mentioned member being normally urged to pin-engaging position and the second member being normally held in pin-releasing position, and the first member being adapted to move outwardly from its normal position and the second member being adapted to simultaneously move inwardly from its normal position to grip the pin when released by the first member.

14. In a pin setter, the combination of a vertically movable carrier, brackets on the carrier, a member pivoted on each bracket for engaging a pin and holding the same upright, a second member on each bracket and engaged with the first member to be moved thereby to center the pin when dropped by the first member, an element mounted in each bracket and connected with the first-mentioned member thereon to operate the latter by the element engaging the alley when the carrier nears the limit of its downward movement, and spring means on each element for restoring the same and members to normal position when the carrier is raised, the first-mentioned member being normally urged to pin-engaging position and the second member being normally held in pin-releasing position, and the first member being adapted to move outwardly from its normal position and the second member being adapted to simultaneously move inwardly from its normal position to grip the pin when released by the first member.

15. In a pin setter, a carrier formed of a set of crossing bars forming rectangular openings and another set of bars rigidly fastened to the first set and intersecting at the center of certain openings while the other openings serve as pin-receiving pockets.

16. In a pin setter, a carrier formed of a set of crossing bars forming rectangular openings and another set of bars rigidly fastened to the first set and intersecting at the center of certain openings while the other openings serve as pin-receiving pockets, and border strips to which both sets of bars are rigidly fastened.

17. In a pin setter, a triangular carrier formed by interlocked side and back metal strips, and longitudinal and transverse metal strips interlocked with the first-mentioned strips and having slots at their points of crossing, whereby the longitudinal and transverse strips interlock, said longitudinal and transverse strips forming openings or pockets for receiving pins at spaced points.

18. In a pin setter, a triangular carrier formed by interlocked side and back metal strips, longitudinal and transverse metal strips interlocked with the first-mentioned strips and having slots at their points of crossing, whereby the longitudinal and transverse strips interlock, said longitudinal and transverse strips forming openings or pockets for receiving pins at spaced points, and diagonal metal strips crossing each other and crossing the longitudinal and transverse strips and having their ends interlocked with the first-mentioned strips, the diagonal strips being slotted to interlock at their points of crossing and to interlock with the longitudinal and transverse strips.

19. In a pin setter, a triangular carrier formed by interlocked side and back metal strips, longitudinal and transverse metal strips interlocked with the first-mentioned strips and having slots at their points of crossing, whereby the longitudinal and transverse strips interlock, said longitudinal and transverse strips forming openings or pockets for receiving pins at spaced points, diagonal metal strips crossing each other and crossing the longitudinal and transverse strips and having their ends interlocked with the first-mentioned strips, the diagonal strips being slotted to interlock at their points of crossing and to interlock with the longitudinal and transverse strips, and pin guiding platforms arranged over the points of crossing of the diagonal strips.

20. In a pin setter, a triangular carrier formed by interlocked side and back metal strips, longitudinal and transverse metal strips interlocked with the first-mentioned strips and having slots at their points of crossing, whereby the longitudinal and transverse strips interlock, said longitudinal and transverse strips forming openings or pockets for receiving pins at spaced points, diagonal metal strips crossing each other and crossing the longitudinal and transverse strips and having their ends interlocked with the first-mentioned strips, the diagonal strips being slotted to interlock at their points of crossing and to interlock with the longitudinal and transverse strips, and pin-guiding platforms arranged over the points of crossing of the diagonal strips, said longitudinal strips being at a higher level than the transverse strips to assist in centering the pins on the platforms.

21. In a pin setter, the combination of a carrier, suspension means for the carrier including separate rotary brake members, a brake shoe adapted to engage both members simultaneously, an operating handle connected with the suspension means, and a brake operating device associated with the handle, whereby the brake shoe is released when the operator grips the handle and is automatically set when the operator releases the handle.

22. In a pin setter, the combination of a carrier, means for guiding the movement of the carrier, counterbalancing weights, flexible elements connected with the weights and carrier, wheels over which the elements pass, additional wheels connected with the first-mentioned wheels, flexible elements adapted to wind on the last-mentioned wheels and connected with the carrier at points remote from the first-mentioned flexible elements, and operating means connected with the weights for raising and lowering the same to cause the lowering and raising of the carrier.

23. In a pin setter, the combination of a carrier, means for guiding the movement of the carrier, counterbalancing weights, flexible elements connected with the weights and carrier, wheels over which the elements pass, additional wheels connected with the first-mentioned wheels, flexible elements adapted to wind on the last-mentioned wheels and connected with the carrier at points remote from the first-mentioned flexible elements, operating means connected with the weights for raising and lowering the same to cause the lowering and raising of the carrier, and a brake device associated with the operating means to be released when the latter is gripped and set when the operating means is released.

LEWIS H. BROOME.